United States Patent [19]

Lee

[11] Patent Number: 4,467,060

[45] Date of Patent: Aug. 21, 1984

[54] HETEROGENEOUS RUBBER HAVING LOW AIR DIFFUSION

[75] Inventor: Biing-Lin Lee, Broadview Heights, Ohio

[73] Assignee: The B. F. Goodrich Company, Akron, Ohio

[21] Appl. No.: 460,424

[22] Filed: Jan. 24, 1983

[51] Int. Cl.³ .............................................. C08J 3/00
[52] U.S. Cl. ............................... 523/353; 152/330 R; 524/526; 525/236; 525/237
[58] Field of Search ................. 524/526; 525/236, 237

[56] References Cited

U.S. PATENT DOCUMENTS 4,342,670 8/1980 Ahagon et al. ..................... 524/526

Primary Examiner—Joseph L. Schofer
Assistant Examiner—T. M. Reddick
Attorney, Agent, or Firm—J. R. Lindsay; D. J. Hudak

[57] ABSTRACT

A heterogeneous rubber composition having good air impermeability is made by mixing together separate fractions of rubbers and fillers.

18 Claims, 2 Drawing Figures

HETEROGENEOUS RUBBER HAVING LOW AIR DIFFUSION

TECHNICAL FIELD

The present invention relates to a process for making a heterogeneous rubber composition having a heterogeneous distribution therein by blending together rubber compounds and fillers. The composition has good air impermeability.

BACKGROUND ART

Heretofore, air impermeable compositions such as those utilized for inner liners in tires were made from butyl type rubbers. Such compositions, although having low permeability to air, were expensive. Natural rubber was often added to such butyl type compositions to provide higher tensile strength and high cured adhesion to a tire carcass compound. However, the air permeability was increased since the air permeability of natural rubber is higher than that of butyl type rubber compounds.

Various elastomer blends containing fillers therein such as carbon black have been mixed with each other with respect to investigating various chemical and physical properties. For example, an article "Carbon Black Distribution in Elastomer Blends" by Hess, Scott, and Callan, Rubber Chemistry and Technology, pages 371 through 383, Volume 40, 1967, discusses the degree of subdivision of different polymer systems and the distribution of reinforcing filler particles between the phases.

Elastomer Blends, Compatibility and Relative Response to Fillers by Callan, Hess and Scott, pages 815–837, Rubber Chemistry and Technology, 1971, relates to zone size variations among different polymer blends, compatibility of butadiene rubber and sytrene-butadiene rubber, filler distribution between separate polymer phases as influenced by fundamental polymer and filler characteristics and carbon black transfer.

The article, Effect of Heterogeneous Carbon Black Distribution on the Properties of Polymer Blends by Sicar, Lamond, and Pinter, pages 48-56, Rubber Chemistry and Technology, 1974, relates to comparisons of blends of varying compatibility, for example, styrene-bytadiene rubber and polybutadiene rubber, styrene-butadiene rubber and natural rubber, and polybutadiene rubber and chlorobutyl rubber. Further, the article Elastomer Blend Properties-Influence of Carbon Black Type and Location by Hess and Chirico, pages 301–326, Rubber Chemistry and Technology, Volume 50, 1977, relates to the study of various blends of different types of rubber and their performance as affected by carbon black.

Finally, the article Experimental Studies of the Relationship of Processing to the Crack Growth of Carbon-Black-Loaded SBR-Cis-Polybutadiene Compounds by Biing-lin Lee, Journal of Applied Polymer Science, Volume 27, pages 3379–3392 (1982), relates to multicomponent polymer systems which are blended together to achieve improved results.

However, none of these articles relate to or suggest the blending of any separate but similar rubber compounds of fillers to yield different and unexpected results such as improvement with regard to air impermeability.

DISCLOSURE OF INVENTION

It is therefore an aspect of the present invention to produce a rubber composition having improved air impermeability made from separate but similar systems or fractions of rubber compounds and fillers.

It is another aspect of the present invention to produce a rubber composition made from separate but similar fractions, as above, wherein a heterogeneous distribution of rubber compounds and fillers are produced.

It is yet another aspect of the present invention to produce a rubber composition made from separate but similar fractions, as above, wherein said composition can be utilized as an inner liner for tires thereby permitting air pressure, reduced rolling resistance, and improved mileage.

It is a still further aspect of the present invention to produce a rubber composition made from separate but similar fractions, as above, wherein one fraction is a minor fraction having relatively large amounts of natural rubber and filler therein.

It is yet a further aspect of the present invention to produce a rubber composition made from separate but similar fractions, as above, wherein one of said fractions is a major fraction which has large amounts of air impermeability type rubbers therein along with generally low amounts of fillers therein.

It is a still further aspect of the present invention to produce a rubber composition made from separate but similar fractions, as above, wherein said fraction can be blended either via a one-step mixing process or a two-step mixing process.

These and other aspects of the present invention will become more apparent from the detailed specification set forth hereinbelow.

In general, a process for making an air permeability resistant rubber composition comprising the steps of: (a) forming a heterogeneous rubber composition comprising by weight approximately 100 total parts of rubber and from about 40 to about 130 parts of a filler, said rubber comprising from about 25 to about 80 parts by weight of natural rubber and from about 20 to about 75 parts by weight of an air impermeable rubber, said rubber composition formed by (b) separately forming a minor fraction comprising from about 15 to about 80 parts by weight of said natural rubber and from about 0 to about 10 parts by weight of said air impermeable rubber, and from about 30 to about 90 parts by weight of said filler, (c) separately forming a major fraction comprising from about 10 to about 75 parts by weight of said air impermeable rubber, from about 0 to about 10 parts by weight of said natural rubber, and from about 1 to about 80 parts by weight of said filler, (d) separately mixing and heating at least one of said fractions, and (e) mixing together under heat said major fraction and said minor fraction to produce said heterogeneous rubber composition.

In general, an air permeable resistant heterogeneos rubber composition, comprises: a mixed blend of a major fraction and a minor fraction forming said heterogeneous rubber composition, said major fraction and said minor fraction having at least one rubber therein, and said major fraction and said minor fraction having similar fillers therein, said heterogeneous composition comprising by weight approximately 100 parts by weight of total rubber, and from about 40 to about 130 parts by weight of said filler, said total rubber comprising from about 25 to about 80 parts by weight of natural rubber and from about 20 parts to about 75 parts by weight of an air impermeable rubber, said minor fraction having from about 15 to about 80 parts by weight of natural rubber, and from about 0 to about 10 parts by weight of an air impermeable rubber, and from about 30 to about 90 parts by weight of a filler, said major fraction having from about 10 to about 75 parts by weight of an air impervious rubber, from about 0 to about 10 parts by weight of natural rubber, and from about 1 to about 80 parts by weight of said filler.

BEST MODE FOR CARRYING OUT THE INVENTION

Figure 1:
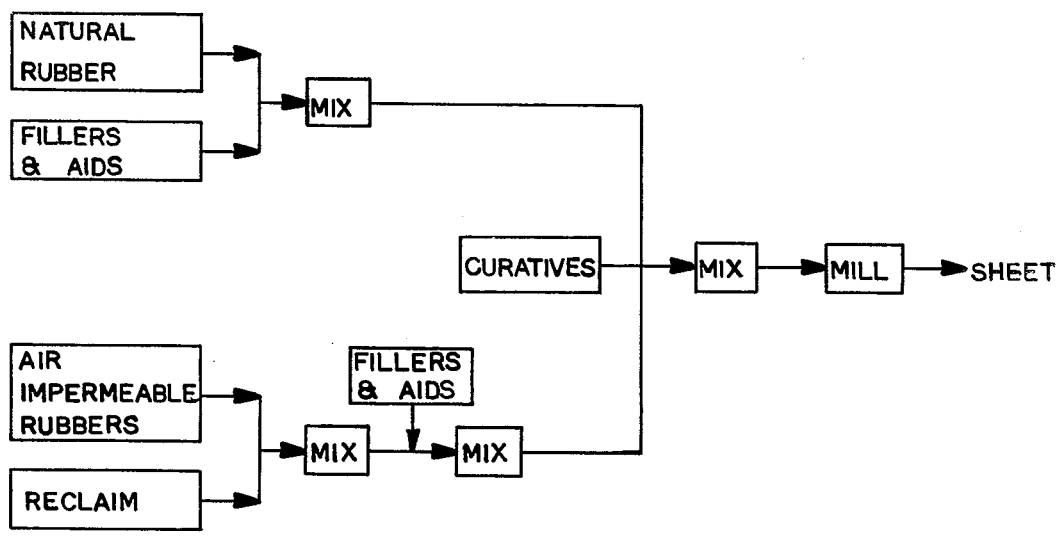
FIG. 1 is a schematic diagram as to a process of preparing a rubber composition according to the present invention.

The present invention relates to a rubber composition generally containing at least natural rubber and/or an air impermeable rubber and to a process for making it such that improved air impermeability rubber products are made, as for example, inner liners in tires. Chemically similar systems or fractions of rubber compounds and fillers such as carbon black and clay and various rubber compounding ingredients or aids are separately formed and then mixed together to form the final product or composition. Generally, one of the fractions has a high amount of filler and natural rubber therein and another chemically similar fraction has a low amount of filler but a high amount of the air impermeable rubber therein.

The final rubber composition, that is after both fractions are mixed or blended, contains approximately 100 parts of rubber. Natural rubber and one or more air impermeable rubbers generally constitute most, if not all, of the 100 parts of rubber in any formulation. However, other types of rubber in varying amounts may also be utilized as long as the air impermeability is generally improved over the same formulation made in the standard manner which results in a homogeneous blend. The amount of natural rubber, or equivalent thereof, exists in an amount of from about 25 to about 80 parts by weight, desirably 30 parts to about 50 parts, and preferably from about 35 to about 45 parts by weight. The air impermeable rubber usually constitutes the difference. That is, from about 50 to about 70, and preferably from about 55 to about 65 parts is of a rubber compound having minimum diffusion of air therethrough. Examples of such compounds include the various types of butyl rubber, for example chlorobutyl rubber, bromobutyl rubber, and the like. Neoprene is still another suitable rubber since it tends to have good air impermeability. Generally, bromobutyl rubber and chlorobutyl rubber are preferred. Additionally, reclaimed rubber of generally any type, e.g., natural rubber, styrene-butadiene rubber, or even butyl rubber, can be utilized as a rubber source. The reclaimed rubber is thus added in lieu of any amount of virgin natural rubber, virgin butyl rubber, and the like, and is thus counted as part of the overall rubber content in the final blend or product, as well as in the major or minor fraction.

The amount of filler in the final rubber composition ranges from about 40 to about 130, desirably from about 50 to about 115, and preferably from about 50 to about 70 parts by weight. Suitable fillers include carbon black and conventional or common types of clay generally utilized in rubber compounding. The filler may be all carbon black, all clay or any combination thereof. The carbon black can generally be from any source, for example, furnace black, thermal black, and the like. The black may be of any general type, that is high surface area, low surface area, high structure type, as well as low structure type. However, the low structured carbon black is somewhat preferred. The clays can be of any common or conventional type and include hard clay, for example, Dixie clay, Par clay, and the like, as well as soft clays, for example, McNamee clay, and the like.

Although the various fillers can be of any shape, non-spherical fillers are desired in that they reduce air permeability. Thus, fillers with platen, ribbon, or lamellar type geometry are desired.

In addition to the above compounds, various other types of ingredients may be utilized well known to those skilled in the rubber art, and especially with regard to the production of inner liners and other air impervious products. Such additional ingredients are typical or conventional compounding agents or aids well known to the art and can be utilized in conventional amounts. Thus, zinc oxide can be utilized, as well as various tackifiers, stearic acid, mineral rubber, various accelerators, various tackifiers, various antiozonates, various curing agents such as sulfur, and the like. The use of such compounds generally does not form a part of the present invention.

The major fraction, so-called because it exists at a continuous phase in the final heterogeneous product, generally has a low loading of the various fillers. The major fraction contains a large amount of air impermeable rubbers, that is generally at least 70 percent of the air impermeable rubbers containing the final rubber composition, and preferably 95 percent or greater or 100 percent. Generally, the major fraction contains from about 10 to about 75 parts by weight, desirably from about 50 to about 70, and preferably from about 55 to about 65 parts by weight of an air impermeable rubber. The major fraction can also contain from 0 or 1 to about 10 parts by weight of the natural rubber therein. Desirably, the major fraction does not contain any natural rubber therein. The types of air impermeable rubber are as set forth above. The amount of carbon black, or clay, or combinations thereof in the major fraction ranges from about 1 to about 80, desirably from about 1 to about 60, and preferably from about 1 to about 35 parts by weight. As noted, the amount of carbon black and/or clays in the major fraction is of a low amount compared to that in the final rubber composition.

The minor fraction so-called since the rubber therein is generally contained as a discontinuous phase in the final rubber composition contains generally 70 percent or greater and preferably 100 percent of all the natural rubber in the final rubber composition. Thus, the minor fraction contains from about 15 to about 80 parts, desirably from about 30 to about 50 parts, and preferably from about 35 to about 45 parts by weight of natural rubber. A small amount of any of the air impermeable rubbers may also be contained in the minor fraction such as from about 0 or 1 up to about 10 parts by weight. However, the minor fraction preferably does not contain any air impermeable rubber. The amount of carbon black and/or clays contained in the minor fraction generally ranges from about 30 to about 90, desirably from about 35 to about 80 preferably from about 35 to about 50 parts by weight.

Such general high amounts of the carbon black and/or clay in the minor fraction and desirably approximately 70 percent by weight of the total fillers and the final product composition have been found to drastically reduce the air permeability of the final rubber composition. In other words, the air permeability of the final rubber composition is affected by the location of the fillers, that is the carbon bond and/or clay in the major or minor fraction phases.

The rubbers and fillers hence form either the major or the minor fraction. Such fractions are chemically similar in that each contains a rubber, for example, natural rubber or an air impermeable rubber. Additionally, the fillers are either clays, carbon black, or both. Moreover, neither fraction contains any foreign additive and hence are similar to each other. Of course, as noted above, the amounts of the various compounds will vary greatly from the major fraction on one hand to the minor fraction on the other hand.

Additionally, various compounding ingredients or aids are used in conventional or standard amounts as noted above. Such aids can generally be added to the major fraction, to the minor fraction, or both fractions, in varying amounts. That is, some of the aids can be added to the major fraction whereas the remainder can be added to the minor fraction. Usually, the curing aids are added near the final mixing stage to prevent any premature vulcanization.

According to the concepts of the present invention, at least one of the systems or fractions is separately mixed, that is the rubber is mixed with the filler and usually various compounding ingredients or aids before it is added to or mixed with the remaining fraction. The remaining fraction can either be unmixed or previously mixed. Mixing of the various rubber compounds, fillers, and ingredients occurs under heat for usually short periods of time. The heating temperatures in time are generally conventionl and well known to those skilled in the art of compounding. The mixing time is generally short, especially when the curing agents have been added to prevent any crosslinking or premature vulcanization of the various blends or compounds. Moreover, the temperatures are generally low. Once the final rubber composition has been made according to any number of processes, it is usually sheeted on a mill. The sheets are then used to make the final product shape, for example an inner liner, and then the final roduct is cured. The curing takes place according any conventional manner as by heating. For example, an item can be cured by heating at about 300° F. for approximately 25 minutes. Of course, the method, time and temperature of cure can greatly vary.

Although several different processes can be utilized in making the various compounds, one specific process is shown in FIG. 1. This process is a so-called two-step process in that the major fraction is separately formed and mixed, the minor fraction is separately formed and mixed, and then both fractions are brought together and mixed. As apparent from FIG. 1, in the minor fraction, the amount of desired natural rubber is added to a mixing device along with a desired amount of fillers and compounding aids and blended as in a Banbury. The mixing time can generally be from about 2 to about 5 minutes, with from about 2.5 to about 3.5 minutes being preferred at a temperature of from about 180° F. to about 350° F., with a temperature of from about 180° F. to about 300° F. being preferred. In a similar manner, the major fraction is prepared. Thus, the desired amount of air impermeable rubbers are added to a mixing device with a reclaim rubber if any, and filler, and mixed, as in a Banbury from about 2 to about 5 minutes. Desirably, the mixing time is from about 2.5 to about 3.5 minutes with the temperature being from about 180° F. to about 350° F., and desirably from about 180° F. to about 300° F. At this stage, both the major and minor fractions have been separately formed and mixed under heat. The major and the minor fraction are then both brought together and mixed, as in a Banbury, along with a desirable amount of curing agents. The final blending together of the major and minor fraction occurs at a temperature of from about 170° F. to about 260° C., desirably from about 170° to about 240° F. at a time period of from about one half to about 2 minutes and desirably from about one half to about 1 minute. At this stage, the final rubber composition is then generally added to a mill so that it can be made in the form of a sheet. The mill temperature generally ranges from about 130° F. to about 200° F., with from about 130° to about 150° F. being desired, and with the time being from approximately 1 to about 2 minutes.

Figure 2:
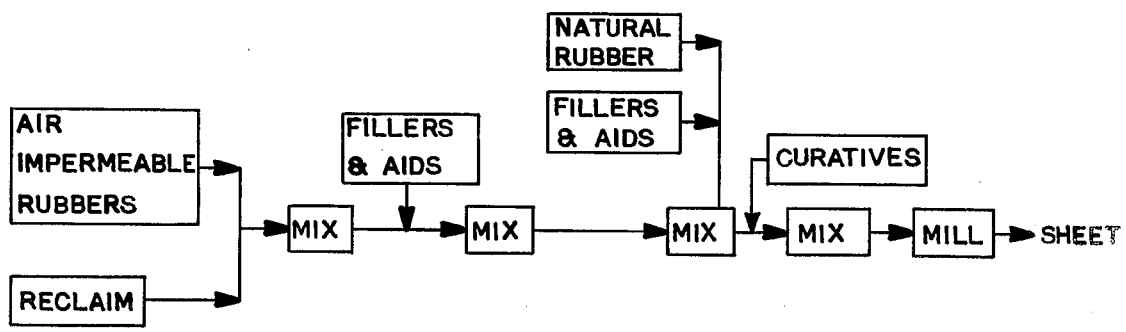
FIG. 2 is another schematic diagram as to a different process for preparing rubber compositions according to the present invention.

Another one of the many different processes which can be utilized is the so-called "one-step" process as shown in FIG. 2. In this process, the desired air impermeable rubbers are mixed together with a reclaimed rubber, if any, in a mixing device such as a Banbury. The desired time and temperatures are the same as in the corresponding portion of the two-step process. After mixing, a desired amount of clay and/or carbon black fillers and compounding aids which form the major fraction are added to the mixing device and mixed as from about 2 to about 4 minutes, preferably from about 2 to about 3 minutes at a temperature of from about 180° to about 340° F. and desirably from about 180° to about 240° F. To this same mixing device, the various compounds, fillers, and compounding ingredients which form the minor compound can be added to the already separately mixed and blended major fraction. Thus, a desired amount of natural rubber, fillers, and compounding aids can be added to the mixing device and mixed as from about 2 to about 5 minutes, preferably from about 2 to about 4 minutes, at a temperature of from about 240° to about 320° F. At this stage, both the major and minor fractions have been mixed under heat. This blend is then mixed, as in a Banbury, along with a desirable amount of curing agents. The mixing conditions are the same as for the two-step, that is, from about 170° to about 260° F., and preferably from about 170° to about 240° F. At this point in the process, a final rubber composition has been formed. In order to render in a suitable form, it is usually sheeted on a mill at a temperature of from about 130° to about 200° F. at about 1 to about 2 minutes.

The final rubber composition, be it either in sheeted form or in the form of a final product, has a major continuous phase therein of at least an air impermeable type rubber and generally a discontinuous minor fraction having at least natural rubber discontinuously dispersed throughout the continuous phase. Use of the natural rubber provides higher tensile strength and cure adhesion of the compound to any rubber compound such as a tire carcass. The final heterogeneous rubber composition also has reduced air permeability. Thus, higher air pressures can be utilized since the pressure is maintained for a longer period of time. A suitable use for such a composition is an inner liner in tires since high air pressure results in lower rolling resistance. This latter aspect results in better mileage. Thus, the process and product of the present invention are ideally suitable for use wherein any good or high air impermeability properties are desired as in tires. Generally, the composition can be used as inner liners in any type of tires such as passenger tires, truck tires, radial tires, off-the-road tires, and the like.

The invention will be better understood by reference to the following examples.

FORMULATION
HETEROGENEOUS RUBBER COMPOSITION

| | Free Mixing Control (PHR) | Minor Fraction (pts.) | Major Fraction (pts.) | Curatives |
|---|---|---|---|---|
| Natural rubber | 45 | 45 | — | — |
| Bromobuyl rubber | 40 | — | 40 | — |
| Reclaim butyl rubber | 30 | — | 30 | — |
| Zinc oxide | 3 | — | — | 3 |
| Sulfur | 0.25 | — | — | 0.25 |
| Clay | 24 | 16.8 | 7.2 | — |
| Mineral Rubber | 10 | 10 | — | — |
| Tackifier | 2 | — | — | 2.0 |
| Stearic Acid | 2 | 1.4 | 0.6 | — |
| Austin Black | 40 | 28 | 12 | — |
| Disulfide Accelerator | 1 | — | — | 1.0 |
| Sulfenamide Accelerator | 0.70 | — | — | 0.70 |
| GPF Black | 30 | 21 | 9 | — |

| | CONTROL (FREE MIXING) | FINAL BLEND OF MAJOR FRACTION MINOR FRACTION |
|---|---|---|
| Air diffusion rate at 30 degrees C., 48 psi | 10.3 to 11 $\times$ 10$^{-4}$ | 6.5 to 7.3 $\times$ 10$^{-4}$ |
| Tensile strength (psi) | | |
| 30 min. $\times$ 280° F. | 984 | 1009 |
| 45 min. $\times$ 280° F. | 1075 | 1089 |
| 150 min. $\times$ 280° F. | 1060 | 1072 |
| Elongation at Break (%) | | |
| 30 min. $\times$ 280° F. | 443 | 436 |
| 45 min. $\times$ 280° F. | 425 | 430 |
| 150 min. $\times$ 280° F. | 401 | 404 |

The diffusion rate equals the cubic feet of air at standard conditions (0° C., and 29.92 inches of mercury) diffusion through a 0.001" thickness of specimen under a pressure differential of 1 psi, per square foot of specimen per day.

The various ingredients set forth in the control recipe were all blended together to form a rubber composition in the following manner. The natural rubber, bromobutyl rubber, and the reclaim filler were mixed in a Banbury for approximately 30 seconds at 200° F. To the Banbury was then added the carbon black, the clay, and the various remaining ingredients except for the curatives. These compounds were mixed at approximately 2½ to 3½ minutes at 200° F. and dumped at a temperature of approximately 300° F. Next, the various curatives were added to the Banbury and blended from about 1 minute at about 170° F. The rubber composition was then dumped onto a mill having a temperature of approximately 150° F. and milled for two minutes. Note that in this control free-mixing process, all of the rubber as well as all of the fillers, that is the clay and the carbon black, as well as various compounding aids, were added to the Banbury and none were mixed separate from one another.

The same formulation containing the same total amounts of ingredients were then prepared in a major fraction, a minor fraction, and as curatives, according to the recipes set forth in the formulation table.

These compounds were mixed according to a two-step mixing process as described in FIG. 1. That is, the natural rubber and the various other ingredients of the minor fraction were added to a Banbury and mixed for 2½ minutes at approximately 200° F. and dumped at 300° F. This formed a blended minor fraction. The ingredients of the major fraction, that is the bromobutyl rubber, and the reclaim rubber (which accounted for 15 parts of rubber by weight) were added to a separate Banbury and mixed for 30 seconds at approximately 200° F. Then, the remaining ingredients of the major fraction, that is the carbon black, clay, and stearic acid were added to the Banbury and mixed for approximately 2½ minutes and dumped at approximately 300° F. This produced a major fraction.

The major fraction blend as well as the minor fraction blend were then brought together in the same Banbury and the various curatives as set forth in the curative formulation were added thereto and all of these components were blended for about 1 to about 2 minutes at approximately 170° F. The resulting heterogenerous rubber composition was then milled for approximately two minutes at 150° F. and sheeted.

An air permeability test was made of each product. An Aminco-Goodrich gas permeability apparatus, American Instrument Company Bulletin 2262A, March 1970, was used to measure the air permeability. The test conditions were as follows: temperature: 30° C., air pressure: 48 psi, thickness of rubber membrane: 0.025 inches, and cure conditions: 280° F. at 150 minutes. The control yielded an air diffusion rate of 10.3 to 11$\times$10$^{-4}$. In contrast, the same recipe process, in accordance with the present invention, that is by loading the minor fraction with a high amount of natural rubber and fillers yielded a heterogeneous rubber composition having an air diffusion rate of 6.5 to 7.3$\times$10$^{-4}$. Thus, a large improvement in air impermeability was achieved.

It is apparent that the process and product of the present invention made therefrom achieved superior air permeability results.

While in accordance with the patent statutes, a best mode and preferred embodiment has been presented, the scope of the invention is set forth by the scope of the attached claims.

What is claimed is:
1. A process for making an air permeability resistant rubber composition, comprising the steps of:
   (a) forming a heterogeneous rubber composition comprising by weight, approximately 100 total parts of rubber and from about 40 to about 130 parts of a filler, said rubber consisting essentially of from about 25 to about 80 parts by weight of natural rubber and from about 20 to about 75 parts by weight of an air impermeable rubber selected from the class consisting of chlorobutyl rubber, bromobutyl rubber, neoprene and combinations thereof, said rubber composition formed by

(b) separately forming a minor fraction comprising from about 15 to about 80 parts by weight of said natural rubber and from about 0 to about 10 parts by weight of said air impermeable rubber, and from about 30 to about 90 parts by weight of said filler, (c) separately forming a major fraction comprising from about 10 to about 75 parts by weight of said air impermeable rubber, from about 0 to about 10 parts by weight of said natural rubber, and from about 1 to about 80 parts by weight of said filler, (d) separately mixing and heating at least one of said fractions, and (e) mixing together under heat said major fraction and said minor fraction to produce said heterogeneous rubber composition.

2. A process according to claim 1, wherein said filler is selected from the group consisting of carbon black, clay, and combinations thereof.

3. A process according to claim 2, wherein the total amount of natural rubber in said final composition ranges from about 30 to about 50 parts by weight, wherein the total amount of said air impermeable rubber in said final composition ranges from about 50 to about 70 parts by weight, wherein said minor fraction has from about 30 to about 50 parts by weight of said natural rubber, wherein said major fraction has from about 50 to about 70 parts by weight of said air impermeable rubber, wherein the total amount of filler in said final rubber composition ranges from about 50 to about 115 parts by weight, wherein said minor fraction has from about 35 to about 80 parts by weight of said filler, and wherein said major fraction has from about 1 to about 60 parts by weight of said filler.

4. A process according to claim 3, including separately forming and mixing said major fraction and adding said minor fraction to said major fraction and blending said fractions to produce said heterogeneous rubber composition.

5. A process according to claim 3, including separately forming and mixing said major fraction, separately forming and mixing said minor fraction, and mixing together said major and minor fraction.

6. A process according to claim 5, including adding curatives to said major and said minor fraction and blending said major fraction and said minor fraction and said curatives.

7. A process according to claim 7, including adding curing agents to said mixed major and minor fractions and mixing.

8. A process according to claim 7, including mixing said major fraction at a temperature ranging from about 180° F. to about 340° F., including mixing said major fraction and said minor fraction at a temperature of from about 240° to about 350° F., and mixing said major fraction, said minor fraction, and said curatives together at a temperature ranging from about 170° F. to about 260° F.

9. A process according to claim 6, including mixing said minor fraction at a temperature ranging from about 180° F. to about 350° F., including separately mixing said major fraction at a temperature ranging from about 180° F. to about 350° F., and mixing said major fraction and said minor fraction and said curatives at a temperature ranging from about 170° F. to about 260° F.

10. An air permeable resistant heterogeneous rubber composition, comprising:
a mixed blend of a major fraction and a minor fraction forming said heterogeneous rubber composition, said major fraction and said minor fraction having at least one rubber therein, and said major fraction and said minor fraction having similar fillers therein,
said heterogeneous composition comprising by weight approximately 100 parts by weight of total rubber, and from about 40 to about 130 parts by weight of said filler, said total rubber consisting essentially of, from about 25 to about 80 parts by weight of natural rubber and from about 20 parts to about 75 parts by weight of an air impermeable rubber selected from the class consisting of chlorobutyl rubber, bromobutyl rubber neoprene and combinations thereof,
said minor fraction having from about 15 to about 80 parts by weight of natural rubber, and from about 0 to about 10 parts by weight of an air impermeable rubber, and from about 30 to about 90 parts by weight of a filler, said major fraction having from about 10 to about 75 parts by weight of an air impervious rubber, from about 0 to about 10 parts by weight of natural rubber, and from about 1 to about 80 parts by weight of said filler.

11. An air permeable resistant heterogeneous rubber composition according to claim 10, wherein said filler is selected from the group consisting of carbon black, clay, and combinations thereof.

12. An air permeable resistant heterogeneous rubber composition according to claim 11, wherein the total amount of natural rubber in said final composition ranges from about 30 to about 50 parts by weight, wherein the total amount of said air impermeable rubber in said final composition ranges from about 50 to about 70 parts by weight, wherein said minor fraction has from about 30 to about 50 parts by weight of said natural rubber, wherein said major has from about 50 to about 70 parts by weight of said air impermeable rubber, wherein the total amount of filler in said final rubber composition ranges from about 50 to about 115 parts by weight, wherein said minor fraction has from about 35 to about 80 parts by weight of said filler, and wherein said major fraction has from about 1 to about 60 parts by weight of said filler.

13. A composition according to claim 12, wherein said heterogeneous rubber composition is made by forming and mixing said major rubber fraction, adding said minor rubber fraction thereto and mixing.

14. A composition according to claim 12, wherein said major fraction is separately formed and mixed, wherein said minor fraction is separately formed and mixed, and wherein said composition is produced by adding together and mixing said rubber fraction and said minor rubber fraction.

15. A composition according to claim 13, wherein a curing agent is added to said mixed blend.

16. A composition according to claim 14, wherein a curative is also added to said combined major fraction and said minor fraction.

17. A composition according to claim 13, wherein said minor fraction comprises from about 35 to about 45 parts by weight of natural rubber, and from about 35 to about 50 parts by weight of said carbon black or said clay fillers, and wherein said major fraction comprises from about 55 to about 65 parts by weight of said chlorobutyl rubber or said bromobutyl rubber, and from about 1 to about 35 parts by weight of said carbon black or said clay filler.

18. A composition according to claim 14, wherein said minor fraction comprises from about 35 to about 45 parts by weight of natural rubber, and from about 35 to about 50 parts by weight of said carbon black or said clay fillers, and wherein said major fraction comprises from about 55 to about 65 parts by weight of said chlorobutyl rubber or said bromobutyl rubber, and from about 1 to about 35 parts by weight of said carbon black or said clay filler.

* * * * *